US006963872B2

(12) United States Patent
Whang et al.

(10) Patent No.: US 6,963,872 B2
(45) Date of Patent: Nov. 8, 2005

(54) ADAPTIVE LOCK ESCALATION BASED ON THE CONCEPT OF UNESCALATABLE LOCKS

(75) Inventors: Kyu Young Whang, Taejon (KR); Ji Woong Chang, Taejon (KR)

(73) Assignee: Korea Advanced Institute of Science & Technology, Taejon (KR)

( * ) Notice: Subject to any disclaimer, the term of this patent is extended or adjusted under 35 U.S.C. 154(b) by 0 days.

(21) Appl. No.: 09/758,184

(22) Filed: Apr. 13, 2001

(65) Prior Publication Data

US 2002/0099703 A1 Jul. 25, 2002

(30) Foreign Application Priority Data

Nov. 30, 2000 (KR) .................................. 10-2000-72043

(51) Int. Cl.$^{7}$ .......................... G06F 17/30; G06F 12/14
(52) U.S. Cl. .......................................... 707/8; 710/200
(58) Field of Search ........................... 707/7–8, 9, 205, 707/100; 710/20–21, 33, 200

(56) References Cited

U.S. PATENT DOCUMENTS 6,101,508 A * 8/2000 Wolff ......................... 709/223
6,144,983 A * 11/2000 Klots et al. ................. 709/104
6,173,293 B1 * 1/2001 Thekkath et al. ........... 707/201
6,363,387 B1 * 3/2002 Ponnekanti et al. .......... 707/10
6,418,438 B1 * 7/2002 Campbell ...................... 707/8

* cited by examiner

*Primary Examiner*—Alford Kindred
(74) *Attorney, Agent, or Firm*—Bacon & Thomas, PLLC

(57) ABSTRACT

In this invention, we propose an adaptive lock escalation scheme that can significantly enhance the performance of the database management system under excessive lock requests. In existing lock escalation methods, under excessive lock requests, the system's performance degrades abruptly even leading to a live halt in the worst case.

The present invention, an adaptive lock escalation in database management systems, proposes a new notion of the unescalatable lock, which is the major cause for making the transactions abort due to lack of lock resources. It uses semi lock escalation and lock blocking based on the total number of unescalatable locks to suppress the growth of unescalatable locks. Furthermore, it guarantees that at least one transaction can complete without getting into live halt by using selective relief. Consequently, the present invention significantly enhances the performance and prevents the system from getting into live halt gradually transiting to a serial execution of transactions under excessive lock requests.

The present invention has the characteristics including the following steps: (a) using semi lock escalation based on the total number of escalatable locks, (b) using lock blocking based on the total number of unescalatable locks, (c) using selective relief when there are no more lock resources available, and all the transactions are blocked waiting for the lock or block resource, and (d) undoing semi lock escalation and lock blocking based on the total number of unescalatable locks of (a) & (b) steps.

6 Claims, 4 Drawing Sheets

ADAPTIVE LOCK ESCALATION BASED ON THE CONCEPT OF UNESCALATABLE LOCKS

BACKGROUND OF THE INVNETION

1. Field of the Invnetion

The present invention relates to the management of lock resources using lock escalation in database management systems. More specifically, the present invention relates to the lock escalation method based on the new concept of the unescalatable locks, which improves performance by using semi lock escalation, lock blocking, and selective relief.

2. Description of the Related Art

First, we define some terminology needed for further description of the present invention.

A "locking" is a concurrency control method. In locking, a transaction has to acquire a lock before accessing the data item to insure the consistency of the database. The "lock granules" are the data aggregates that are atomically locked to insure consistency. Examples of the lock granules are databases, files, pages, and records.

The "multigranularity locking" is a method, that provides several lock granules in a DBMS to allow a transaction to determine lock granularity for itself. In this method, acquiring the lock on a higher-level granule is implicitly considered as acquiring the same lock mode on a lower-level granule.

Typical lock modes used for multigranularity locking are the shared(S), exclusive(X), and intention(I) modes. In the intention mode, we distinguish the intention shared(IS) mode and the intention exclusive(IX) mode. An S mode lock allows only read accesses to the data item locked, but an X mode lock allows both read and write accesses. An I mode lock indicates an intention to request S or X mode locks for the lower-level lock granules.

TABLE 1

| 102 \ 101 | IS | IX | S | X |
|---|---|---|---|---|
| IS | T | T | T | F |
| IX | T | T | F | F |
| S | T | F | T | F |
| X | F | F | F | F |

T: compatible, F; incompatible

Table 1 represents the compatibility between lock modes. In Table 1, numerical no. 101 is the acquired lock mode, and numerical no. 102 is the requested one. We use the term "file" for the coarse granule and the term "record" for the fine granule to help readers understand the present invention.

Database management systems (DBMSs) have limited lock resources due to a physical limitation of shared memory. In most cases, the system administrator determines the maximum number of locks supported by a DBMS when he starts the DBMS. Thus, when locks are requested excessively at the same time, lock resources are exhausted, and then the transactions that are not able to secure locks should be aborted. This situation is "lock resource exhaustion".

Lock resource exhaustion may cause a transaction to fall in "cyclic restart," in which the transaction is repeatedly aborted and restarted, but is never given the opportunity to commit. In the worst case, all transactions could fall in cyclic restart and none of them commits. This situation is "live halt."

Lock escalation is considered as a solution for this problem. Lock escalation consists of two steps: "lock conversion" and "lock release". "Lock conversion" is the step for converting the mode of the lock on the file from IS to S or from IX to X. "Lock release" is the step for releasing all the locks on the records that belong to the file.

Now, we introduce the existing lock escalation methods. In UniSQL, Database Administration Guide (All Products), 1996. [Reference 1], lock escalation is executed when a transaction acquires record locks over the predetermined lock escalation threshold for a specific file. The same lock escalation threshold is applied to all the transactions and files. We call this method as "Lock Escalation Based on Locks per Transaction and per File (LETF)." LETF has the following problems.

First, it might execute needless lock escalation when a transaction acquires record locks over the threshold for a specific file even though there are extra lock resources available. In other words, lock escalation is needless since the possibility of lock resource exhaustion is low if there are few concurrent transactions even though a transaction acquires record locks for a specific file over the threshold.

Second, a transaction might not execute lock escalation because the number of locks requested is less than the threshold even when there are no more lock resources available. If many transactions execute concurrently, lock resources could be exhausted even though none of transaction requests locks over the threshold.

In IBM, IBM DB2 Universal Database Administration Guide, Version 6, ftp://ftp.software.ibm.com/ps/products/db2/info/vr6/htm/db2d0/index.htm, 2000. [Reference 2], a transaction selects one of the files it is accessing, and then executes lock escalation for that file when the total number of locks it requests goes over the lock escalation threshold regardless the file. The same lock escalation threshold applies to all transactions. This method has problems similar to those of LETF.

These problems can be potentially alleviated by allowing the transaction requesting a lock to execute lock escalation when there are no more lock resources available even though it has requested locks below the threshold.

Considering the total number of locks as in this method, however, does not solve the problem completely. When there are no more lock resources remaining, but the transaction is not able to execute lock escalation because of lock conflict, the transaction is aborted even though it is still possible that other transactions execute lock escalation instead.

SUMMARY OF THE INVENTION

The present invention is devised to solve the problems of the previous method discussed above. The purpose of the present invention is to provide a lock escalation algorithm in the database management system, called "Adaptive Lock Escalation" based on the new concept of the unescalatable lock. The algorithm employs the notions of "semi lock escalation" and "lock blocking" to manage the lock resources efficiently, and "selective relief" to guarantee that no live halt occurs under excessive lock requests, gradually transiting to a serial execution of transactions and enhancing the performance. The algorithm utilize these notions based on the total number of unescalatable locks.

Figure 1:
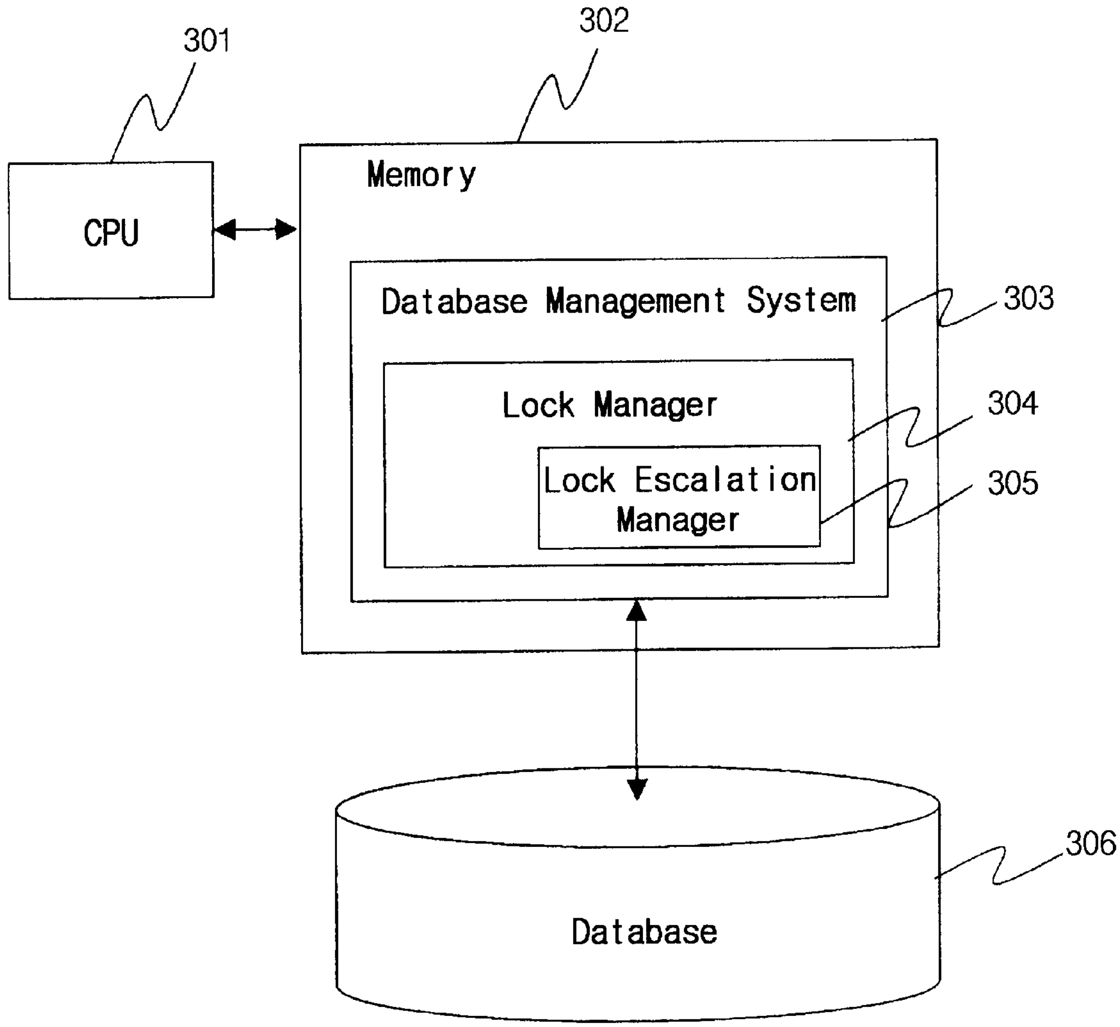
FIG. 1 is a system block diagram showing a preferred embodiment of the system in which the adaptive lock escalation of the present invention is implemented.

To accomplish the above purpose, the present invention comprises the following steps: (a) using semi lock escalation based on the total number of unescalatable locks, (b) using lock blocking based on the number of unescalatable locks, (c) using selective relief when there are no more lock resources available, and all the transactions are blocked waiting for the lock or lock resource, and (d) undoing semi lock escalation and lock blocking based on the total number of unescalatable locks of (a) & (b) steps.

DETAILED DESCRIPTION OF THE EMBODIMENTS

According to the preferred embodiment that will be explained later by using the attached drawings, the purposes and advantages of the present invention can be understood by the people experienced in this field.

Hereafter, preferred embodiment according to the present invention is described in detail by referring to accompanying drawings.

Regarding to how lock escalation can be handled, we propose and define the following four states of a file which are new notions: “free state”, “escalatable state”, “unescalatable state”, and “fully escalated state”.

The file state where no locks are held by any transaction is defined as a “free state”. In this “free state” record lock can not exist. The file where the locks can be escalated without causing lock conflict is in the “escalatable state”, and this file is defined as an “escalatable file”. Also, a record lock that belong to the “escalatable file” is defined as an “escalatable lock”.

The file where the locks can not be escalated because of lock conflict is in the “unescalatable state”, and this file is defined as an “unescalatble file”. Also, a record lock that belong to the “unescalatable file” is defined as an “unescalatable lock”.

The file on which only S or X mode locks are held is in “fully escalated state”. Therefore, there is no record lock that belongs to the file in the fully escalated state.

We can identify the state of a file by the combination of the modes of the locks held on the file. Table 2 shows the relationship between the states of a file and the combinations of the modes of the locks held on the file. In Table 2, numerical no. 201 is the state of a file, and numerical no. 202 the combination of the modes of the locks held on the file.

TABLE 2

| | 201 | |
|---|---|---|
| | state of a file | Combination of the modes of the locks held on the file |
| 202 | free state | |
| | fully escalated states | $\{X\}^{1}$ |
| | | $\{S\}^{1+}$ |
| | unescalatable states | $\{IX\}^{2+}$ |
| | | $\{IX\}^{1+}, \{IS\}^{1+}$ |
| | escalatable states | $\{IX\}^{1}$ |
| | | $\{IS\}^{1+}$ |
| | | $\{S\}^{1+}, \{IS\}^{1+}$ |

$\{A\}^{1}$: Only one A mode lock is granted.
$\{A\}^{n+}$: n or more A mode locks are granted.
$\{A\}^{n+}, \{B\}^{m+}$: n or more A mode Locks and m or more B mode locks are granted.

Adaptive lock escalation is a method that determines execution of lock escalation based on the total number of unescalatable locks. Furthermore, to enhance the performance, adaptive lock escalation has additional features that suppress the growth of unescalatable locks.

“Semi lock escalation” is lock escalation in which only the first step (lock conversion) is executed. After executing semi lock escalation, a transaction must continue holding and acquiring the record locks to allow undoing semi lock escalation unless the second step (lock release) has been executed.

We can take advantage of semi lock escalation using the following scenario. When the number of unescalatable locks exceeds the threshold, we execute semi lock escalation to prevent further increase in unescalatable locks. We then execute the second step of lock escalation only when there are no more lock resources available. This method has the same effect as lock escalation in that it suppresses the growth of unescalatable locks. However, it has an extra benefit of increasing concurrency by undoing semi lock escalation for the file for which the second step has not yet been performed in case the number of unescalatable locks decreases below the threshold.

“Lock blocking” is an operation that prevents a new file lock from being granted on an unescalatable file. “Lock unblocking” is the reverse operation cancelling the effect of lock blocking. By preventing new file locks on unescalatable files from being granted, lock blocking disallows increase in the number of transactions accessing an unescalatable file. Thus, the growth of unescalatable locks is suppressed since the number of unescalatable lock requests is decreased.

In spite of semi lock escalation and lock blocking, the number of unescalatable locks may increase. In the worst case, live halt could occur since lock resources are exhausted and there is no more escalatable file. To solve this problem, when there are no more lock resources available, we may block the transaction requesting a lock until some locks are returned instead of aborting the transaction. However, this method does not solve the problem completely. The reason is as follows. If there is no escalatable file, lock escalation cannot be executed, and locks are returned only when a transaction terminates. If all the transactions request locks, however, all of them are blocked, and locks are not returned. Thus, the only way to resolve the situation is to select a victim and abort it.

In this situation, we must be careful in selecting the victim to prevent the system from getting into live halt, where all the transactions fall into cyclic restart. Adaptive lock escalation uses selective relief as a method to prevent live halt.

"Selective relief" is a method that guarantees completion of a transaction by excepting it from the candidates for victims and by executing lock escalation on all the files it accesses. We call this transaction the "immortal transaction." To guarantee the completion of the immortal transaction, all the transactions having locks conflicting with lock escalation and acquisition of new locks by the immortal transaction are aborted. In case the immortal transaction accesses a new file, it also executes lock escalation for the file.

By definition, the immortal transaction does not have lock conflicts any longer and will not wait for the lock, (due to lock conflict,) or lock resource. Since at least one transaction, i.e., the immortal transaction, can complete without getting into cyclic restart, it is guaranteed that the system does not fall into live halt.

As the above description, adaptive lock escalation consists of the following four steps: (a) using semi lock escalation based on the total number of unescalatable locks, (b) using lock blocking based on the total number of unescalatable locks, (c) using selective relief when there are no more lock resources available, and all the transactions are blocked waiting for the lock or lock resource, and (d) undoing semi lock escalation and lock blocking based on the total number of unescalatable locks of (a) & (b) steps. In the following, we explain the preferred embodiment of the present invention in more detail by using the attached drawings.

To perform adaptive lock escalation, the present invention needs the hardware environment that is drawn in FIG. 1. In FIG. 1, numerical no. 301 represents a CPU of the computer, and numerical no. 302 represents the main memory of the computer. The database management system (303) resides in the above main memory (302). The lock manager (304) is implemented in the database management system (303) and the lock escalation manager (305), being a part of the lock manager, handles lock escalation. Adaptive lock escalation is implemented in the lock escalation manager (305). The above database management system (303) manages the data that are stored in the database (306).

Adaptive lock escalation algorithm consists of three parts. In the first part (FIG. 2), which is activated by each lock request operation, we use semi lock escalation and lock blocking based on the total number of unescalatable locks. In the second part (FIG. 3), which is activated by the demon process detecting the situation where all the transactions are blocked waiting for the lock or lock resource, we use selective relief. In the third (FIG. 4), which is activated by each lock release operation, we undo the semi lock escalation and lock blocking based on the total number of unescalatable locks.

Figure 2:
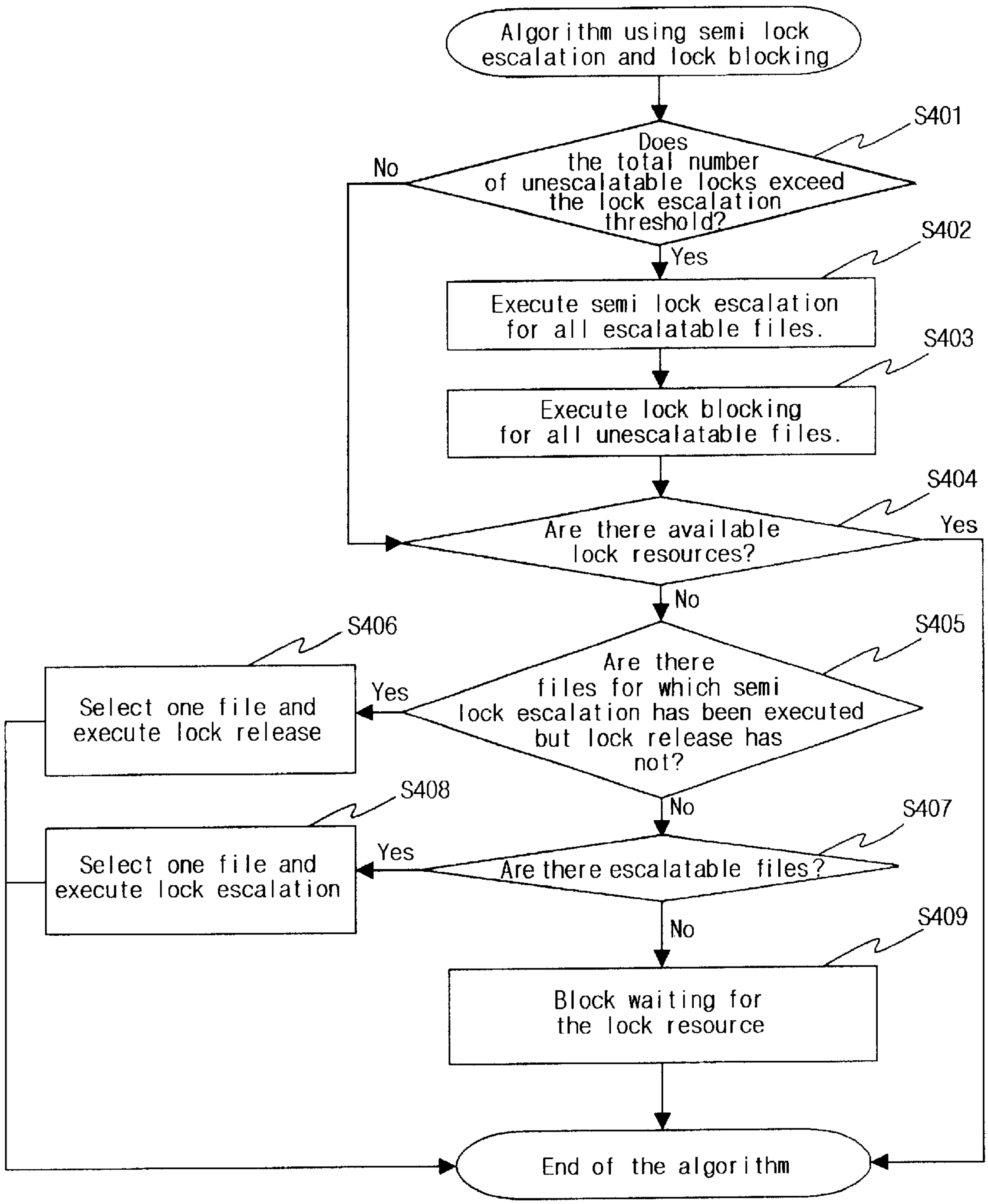
FIG. 2 is the flowchart showing the algorithm using semi lock escalation and lock blocking in the adaptive lock escalation of the present invention.

In FIG. 2, the algorithm consists of nine steps. In the first step (S401), we check whether the total number of unescalatable locks exceeds the lock escalation threshold or not. If the total number of unescalatable locks does not exceed the lock escalation threshold, then we check whether there are available lock resources or not (S404). Otherwise, in the second step (S402), we execute semi lock escalation for all escalatable files and in the third step (S403), we execute lock blocking for all unescalatable files.

In the fourth step (S404), we check whether there are available lock resources or not. If there are available lock resources, then we end the algorithm. Otherwise, in the fifth step (S405), we check whether there are files for which semi lock escalation has been executed, but lock release has not. If there are files for which semi lock escalation has been executed, but lock release has not, then in the sixth step (S406), we select one file among them, complete lock escalation by executing lock release to get lock resources returned, and end the algorithm. Otherwise, in the seventh step (S407), we check whether there are escalatable files or not. If there are escalatable files, then in the eighth step (S408), we select one, execute lock escalation (lock conversion and lock release), and end the algorithm. Otherwise, in the ninth step (S409), the transaction requesting the lock is blocked until some locks are released since it cannot secure a lock resource and ends the algorithm.

In the above ninth step (S409), if all transactions are blocked waiting for the lock or lock resource, we use selective relief. The algorithm using selective relief is activated periodically by demon process.

Figure 3:
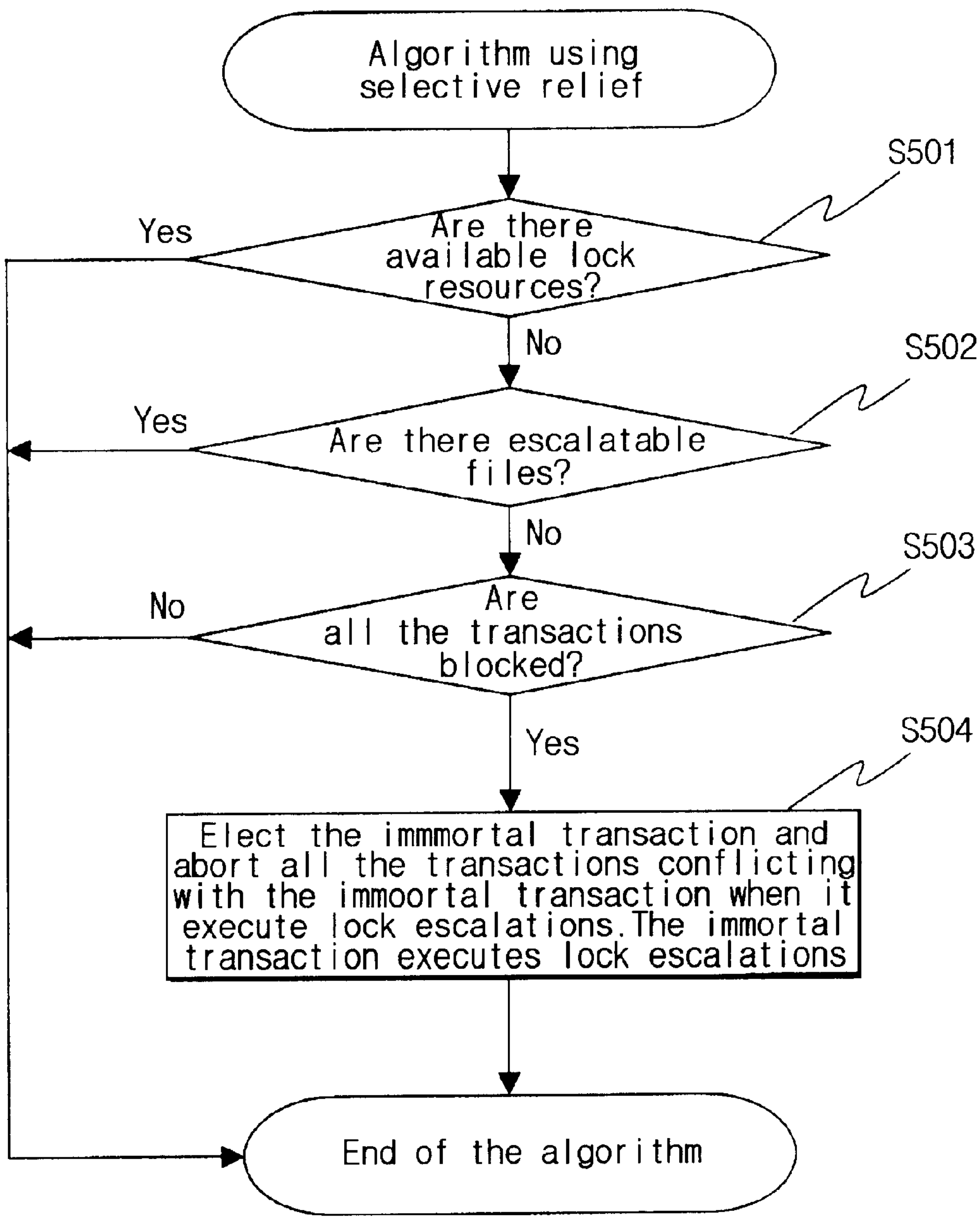
FIG. 3 is the flowchart showing the algorithm using selective relief in the adaptive lock escalation of the present invention.

FIG. 3 is the flowchart showing the algorithm using selective relief in the adaptive lock escalation of the present invention. In the first step (S501), we check whether no more lock resources are available. If there are available lock resources, then we end the algorithm since selective relief is not needed. Otherwise, in the second step (S502), we check whether there are escalatable files or not. If there are escalatable files, then we end the algorithm since lock resources can be returned by executing lock escalation. Otherwise, in the third step (S503), we check whether all transactions are blocked waiting for lock or the lock resource. If there are transactions that are not blocked, then we end the algorithm since selective relief is not needed. Otherwise, in the fourth step (S504), we perform selective relief by electing the immortal transaction and by aborting all the transactions conflicting with the immortal transaction when it executes lock escalations and by executing lock escalations. Then algorithm ends.

Figure 4:
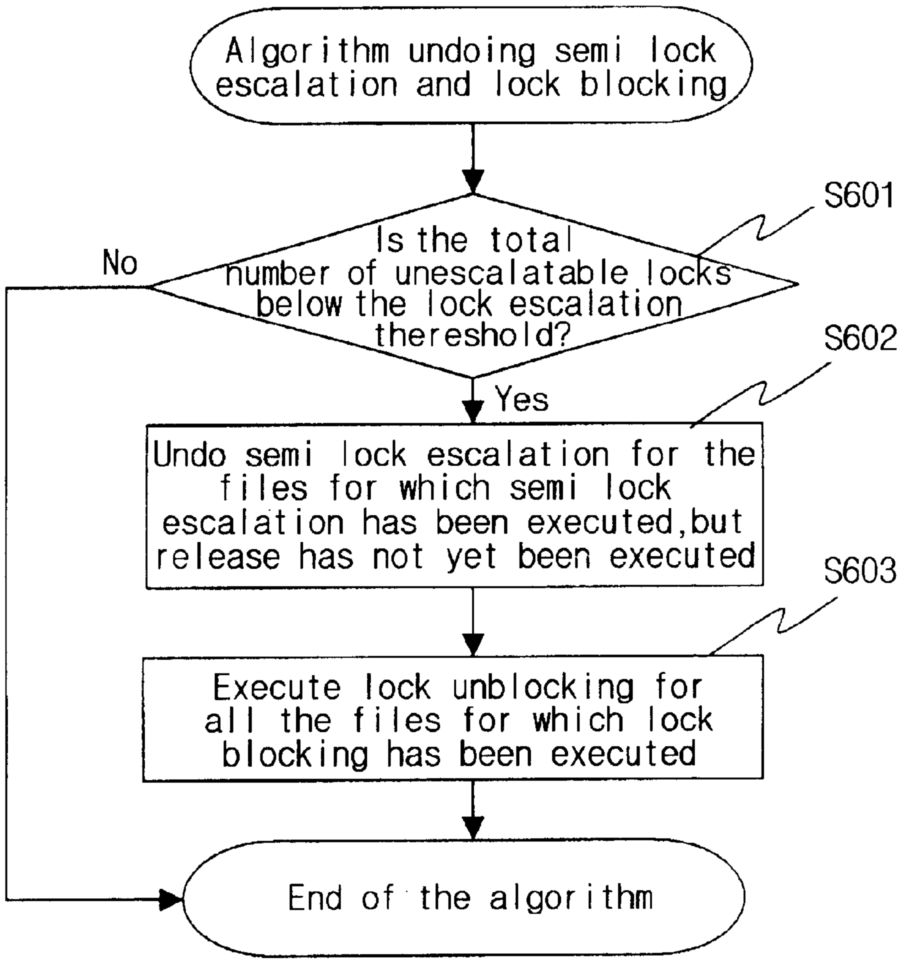
FIG. 4 is the flowchart showing the algorithm undoing semi lock escalation and lock blocking in the adaptive lock escalation of the present invention.

FIG. 4 is the flowchart showing the algorithm undoing semi lock escalation and lock blocking in the adaptive lock escalation of the present invention. The algorithm undoing semi lock escalation and lock blocking is activated by each lock release operation. In the first step (S601), we check whether the total number of unescalatable locks is behind the lock escalation threshold or not. If no, then we end the algorithm. Otherwise, in the second step (S602), we undo semi lock escalation by reverting the lock modes of the files for which lock release has not been performed yet. In the third step (S603), we undo lock blocking by executing lock unblocking and end the algorithm. These actions allow all the transactions that have been put on hold by semi lock escalation or lock blocking to continue.

Activation of mechanisms in adaptive lock escalation such as semi lock escalation or lock blocking is based on the total number of unescalatable locks rather than the total number of locks. Thus, as long as the number of unescalatable locks is held below the threshold, the total number of locks is free to exceed the threshold being only limited by the total amount of lock resources. This means that adaptive lock escalation prevents decrease of concurrency caused by needless lock escalation. Adaptive lock escalation guarantees that live halt will not occur by allowing at least one transaction, i.e., the immortal transaction, to commit even when lock resources are exhausted. Thus, under excessive lock requests, the system will gracefully lead to a serial execution of transactions.

Experimental results show that, under excessive lock requests, adaptive lock escalation provides graceful performance degradation while existing methods suffer from abrupt changes in performance leading to live halt. Especially, adaptive lock escalation significantly reduces the number of aborts and the average response time and, at the same time, increases the throughput. Furthermore, adaptive lock escalation guarantees that no live halt occurs under excessive lock requests, gradually transiting to a serial execution of transactions. As a result, we have been able to increase the number of concurrent transactions allowable by more than 16~256 times.

According to the above description, adaptive lock escalation of the present invention in database management systems enhances the performance and increases the number of concurrent transactions allowable by more than 16~256 times compared with the existing ones. Furthermore, it gracefully leads the system to a serial execution of transactions by using semi lock escalation and lock blocking to suppress the growth of unescalatable locks, and by using selective relief to prevent the system from getting into live halt under the excessive lock requests.

What is claimed is:

1. An adaptive lock escalation method based on the total number of unescalatable locks comprising the steps of:

a) using semi lock escalation based on the total number of unescalatable locks, wherein semi lock escalation is an escalation in which, after lock conversion, a transaction must continue holding and acquiring record locks to allow undoing the conversion unless a lock release has been executed;

b) using lock blocking by preventing a new file lock from being granted on an unescalatable file;

c) using selective relief; and d) undoing the semi lock escalation and lock blocking which has been executed in the above a) and b) based on the total number of unescalatable locks.

2. The method of the step (a) of claim 1, which executes semi lock escalation for all escalatable files to suppress the growth of unescalatable locks when the total number of unescalatable locks exceeds the lock escalation threshold.

3. The method of the step (a) of claim 1, which executes lock blocking for all unescalatable files to suppress the growth of unescalatable locks when the total number of unescalatable locks exceeds the lock escalation threshold.

4. The method of the step (a) of claim 1, which uses selective relief to prevent live halt.

5. The method of the step (a) of claim 1, which undoes semi lock escalation and lock blocking to increase the concurrency when the total number of unescalatable locks decreases below the lock escalation threshold.

6. The method of the step (a) of claim 1 which executes lock escalation when the total number of unescalatable locks exceeds the lock escalation threshold.

* * * * *